United States Patent [19]

Stringer et al.

[11] Patent Number: 5,573,078
[45] Date of Patent: Nov. 12, 1996

[54] STEERABLE, SELF-POWERED SHOPPING CART TOWING APPARATUS AND METHOD FOR MAKING SAME

[76] Inventors: Calvin R. Stringer, 35606 Anthony Rd., Saugus, Calif. 91350; Calvin D. Stringer, 2610 Fairfield Ave., Palmdale, Calif. 93550

[21] Appl. No.: 494,613

[22] Filed: Jun. 23, 1995

Related U.S. Application Data

[63] Continuation-in-part of Ser. No. 292,310, Aug. 18, 1994, abandoned.

[51] Int. Cl.⁶ ..................................... B62D 51/04
[52] U.S. Cl. ........................... 180/19.2; 180/11; 180/216
[58] Field of Search .................... 180/19.1, 19.2, 180/19.3, 11, 210, 215, 216; 280/33.992, 33.991

[56] References Cited

U.S. PATENT DOCUMENTS

| | | | |
|---|---|---|---|
| 2,879,858 | 3/1959 | Thomas | 180/19.2 |
| 3,312,300 | 4/1967 | Jones | 180/19.2 |
| 3,503,466 | 3/1970 | Rosander | 180/11 X |
| 3,557,893 | 1/1971 | Kohls | 180/19.3 X |
| 3,575,250 | 4/1971 | Dykes | 180/11 |
| 4,096,920 | 6/1978 | Heyn | 180/11 |
| 4,538,695 | 9/1985 | Bradt | 180/19.2 |
| 4,771,840 | 9/1988 | Keller | 180/11 |
| 5,082,074 | 1/1992 | Fischer | 180/19.1 X |
| 5,318,144 | 6/1994 | Berlinger, Jr. | 180/216 X |
| 5,322,306 | 6/1994 | Coleman | 180/19.1 X |
| 5,439,069 | 8/1995 | Beeler | 180/19.1 X |

FOREIGN PATENT DOCUMENTS

2213442  8/1989  United Kingdom ..................... 180/11

*Primary Examiner*—Kevin Hurley
*Attorney, Agent, or Firm*—John J. Posta, Jr.

[57] ABSTRACT

A steerable, self-powered device for use in towing and guiding a plurality of shopping carts attached together in a line from one location to another is disclosed which has a pair of electrically driven wheels located in the rear thereof, and a single wheel located in the front thereof for use in steering the towing and guiding device. The towing and guiding device is small and low to the ground, and includes a retaining mechanism which may be attached to the line of shopping carts by connection to the bottom front cross-bar of the front-most shopping cart in the line of shopping carts. The towing and guiding device is powered by one or more batteries, and in the preferred embodiment includes a battery charger and a retractable cord to supply power to the battery charger.

16 Claims, 5 Drawing Sheets

STEERABLE, SELF-POWERED SHOPPING CART TOWING APPARATUS AND METHOD FOR MAKING SAME

This application is a continuation-in-part of U.S. patent application No. 08/292,310, filed on Aug. 18, 1994, now abandoned and entitled "Steerable, Self-Powered Shopping Cart Towing Apparatus and Method for Making Same."

BACKGROUND OF THE INVENTION

Field of the Invention

The present invention relates generally to the field of devices used for towing loads, and more particularly to a steerable, self-powered device which is specifically designed for use in towing and guiding a plurality of shopping carts from one location to another.

As shopping centers have evolved from the small individual store located on a relatively small location to large multi-store shopping centers, and even to warehouse-style stores with huge parking lots, new problems not encountered in the smaller locations have developed. One of these problems is that with large parking lots taking up a considerable area surrounding the stores, shopping carts must be periodically rounded up and returned to the stores. Such large lots typically have shopping cart collection areas; those carts scattered around the parking lot are also marshaled to a number of locations for collection.

Typically, a large number of shopping carts ranging from ten to fifty shopping carts are placed together, each one fitting into the next adjacent one, in a line. The line of shopping carts is then tied together with a length of rope to retain them in a row, so that the thusly secured line of shopping carts may be returned to the store to which they belong for reuse. The line of shopping carts is then pushed and/or pulled back to the store, a task which requires considerable strength due both to the combined weight of the line of shopping carts, and the rather unwieldy, difficult to maneuver nature inherent in the tied-together line of shopping carts.

The job of returning the line of shopping carts to the store at which they belong has been almost exclusively a manual task due to the fact that the shopping carts must be brought into the store through a standard size door. While a forklift or similar device may be used to pull the line of shopping carts through the parking lot, typically pulling or pushing the line of shopping carts into the store is a task which must be done by hand since the forklift is simply too large to fit through most store doors. Thus, the most difficult part of the job of returning the line of shopping carts to the store must be done by hand, taking both considerable time and considerable effort, and often requiring more than one employee to perform the task.

It is accordingly the primary objective of the present invention that it provide a device which is capable of easily towing and guiding a line of tied-together shopping carts through a parking lot, through the door of a store, and into their desired place in the store. As such, it is a related objective of the present invention that the towing and guiding device of the present invention be conveniently operable by one person, thereby reducing the labor required to gather the shopping carts, tow them through the parking lot, and take them into the store into their desired storage location. It is a further objective that the device of the present invention be easy to operate, and that it be highly maneuverable to allow the line of shopping carts to be easily maneuvered around obstacles in the parking lot and through the doors of the store without becoming hung up or bumping up against anything in the process.

It is an additional objective of the towing and guiding device of the present invention that it be highly compact in size, thereby further facilitating its maneuverability and enhancing its ability to be stored in a relatively small amount of space. It is yet another objective that the towing and guiding device of the present invention be self-powered to facilitate moving the line of shopping carts easily without requiring great strength to be exerted by the operator of the device. It is also an objective that the towing and guiding device of the present invention be electric powered to eliminate the emission of air pollution in the parking lot and in the store, and also to make the operation of the towing and guiding device virtually completely quiet.

The towing and guiding device of the present invention must also be of construction which is both durable and long lasting, and it should also require little or no maintenance to be provided by the user throughout its operating lifetime. In order to enhance the market appeal of the towing and guiding device of the present invention, it should also be of economical construction to thereby afford it the broadest possible market. Finally, it is also an objective that all of the aforesaid advantages and objectives of the towing and guiding device of the present invention be achieved without incurring any substantial relative disadvantage.

SUMMARY OF THE INVENTION

The disadvantages and limitations of the background art discussed above are overcome by the present invention. With this invention, a towing and guiding device is used to pull a line of shopping carts through a parking lot to a store, through a door into the store, and into position at a desired storage location for the parking carts. The towing and guiding device is a small, self-powered device which has three wheels, two in the rear and one in the front. A retaining mechanism is used to attach the line of shopping carts to the towing and guiding device so that the shopping carts may be pulled by the towing and guiding device.

The towing and guiding device is relatively small, and it is designed in a manner which is low to the ground, since it will be attached to the line of shopping carts by connection of the retaining mechanism to the bottom front cross-bar of the front-most shopping cart in the line of shopping carts. The towing and guiding device has two wheels located in the rear, which rear wheels are, in the preferred embodiment, connected to a live axle used to drive the towing and guiding device. It has a single wheel located in the front, which wheel is located at the center of the towing and guiding device and is used for steering.

The towing and guiding device is powered by two 12 Volt automobile-type batteries in the preferred embodiment, which are used to drive a DC electric motor. The electric motor drives the live axle through a dual reduction pulley arrangement. The electric motor may be connected in either polarity to selectively drive the towing and guiding device in either a forward direction or a reverse direction.

The front wheel is turned by using a handle extending to the front of the towing and guiding device. By turning the handle, the towing and guiding device may be steered in the desired direction. The handle may be either a T-shaped arrangement, or a simple stick-type handle.

The electrical operation of the towing and guiding device is controlled by an on/off switch located on the handle. A forward/reverse switch is also preferably located on the handle. If desired, a variable speed selecting switch may also be provided, either separately or in combination with the on/off switch. In the preferred embodiment, a key switch is also provided on the towing and guiding device.

The towing mechanism of the preferred embodiment is a tow bar which is suspended from a centrally located point (a point located between the front wheel and the rear wheels) on the towing and guiding device. The towing mechanism has a retaining mechanism located at the rear of the towing and guiding device, which retaining mechanism is designed to engage and retain the bottom front cross-bar of the front-most shopping cart in the line of shopping carts.

Alternate embodiments of the retaining mechanism are straps which are selectively released from and retracted back onto a strap reel located at the rear of the towing and guiding device. The mechanisms which may be used for the strap reel include a reel lock/unlock mechanism, a motorized reel mechanism, and a one-way reel mechanism which, once initially extended, will not allow the strap to be again extended until it is substantially entirely retracted.

In the preferred embodiment, the towing and guiding device also includes a battery charger which is built into the device. In the preferred embodiment, a recharging cord contained on a spring-loaded retractor mechanism may be used to connect the battery charger to a source of AC power to recharge the batteries.

In another aspect of the preferred embodiment, the retaining mechanism located at the rear of the towing and guiding device is adapted to prevent the retaining mechanism from traveling around either of the bends at the bottom front cross-bar of the front-most shopping cart in the line of shopping carts. This is accomplished by providing support members in the retaining mechanism which closely engage the bottom front cross-bar of the front-most shopping cart, thereby preventing it from slipping around either of the bends at the bottom front cross-bar.

It may therefore be seen that the present invention teaches a device which is capable of easily towing and guiding a line of tied-together shopping carts through a parking lot to a store, through the door of the store, and into their desired place in the store. As such, the towing and guiding device of the present invention is operable by one person, thereby reducing the labor required to gather the shopping carts, tow them through the parking lot, and take them into the store into their desired storage location. The towing and guiding device of the present invention is easy to operate, and it is also highly maneuverable to thereby allow the line of shopping carts to be easily maneuvered around obstacles in the parking lot and through the doors of the store.

The towing and guiding device of the present invention is also highly compact in size, thereby further facilitating its maneuverability and enhancing its ability to be stored in a relatively small amount of space. In addition, it is self-powered to facilitate moving the line of shopping carts easily, without requiring great strength to be exerted by the operator of the device. The towing and guiding device of the present invention is also electric powered to eliminate the emission of air pollution in the parking lot and in the store, and also to make the operation of the towing and guiding device virtually completely quiet.

The towing and guiding device of the present invention is of construction which is both durable and long lasting, and will require little or no maintenance to be provided by the user throughout its operating lifetime. It is also of economical construction to thereby enhance its market appeal, and to afford it the broadest possible market. Finally, all of the aforesaid advantages and objectives of the towing and guiding device of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
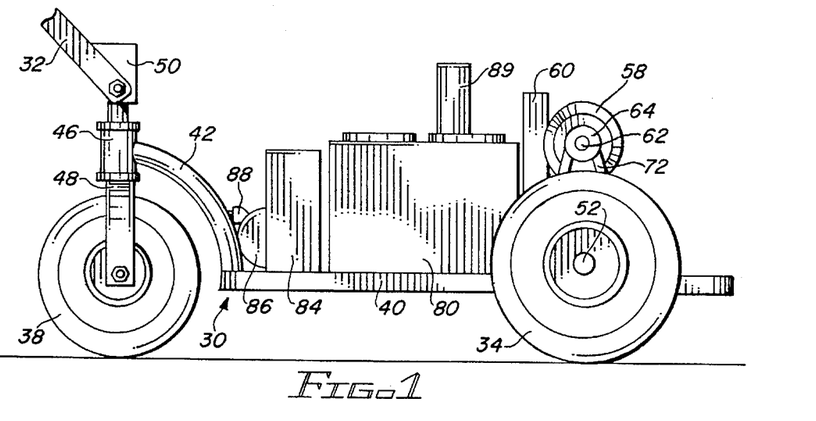
FIG. 1 is a side view of a towing and guiding device which is constructed according to the teachings of the present invention, with its cover and its tow bar removed for clarity, and with only the bottom of its control handle illustrated, showing the steering mechanism and the central placement of the tow bar support post with respect to the front wheel and the rear wheels.
Figure 2:
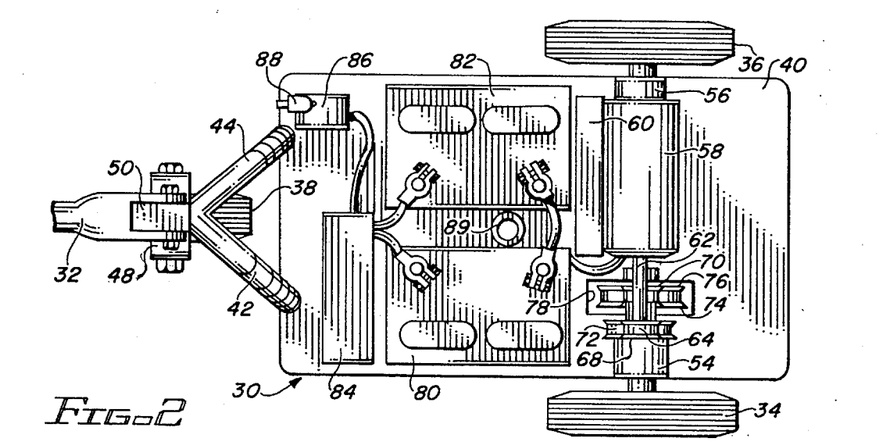
FIG. 2 is a side view of the towing and guiding device as illustrated in FIG. 1, showing the lateral location of the tow bar support post as well as the relative locations of the batteries, the battery charger, and the recharging cord retractor mechanism.
Figure 3:
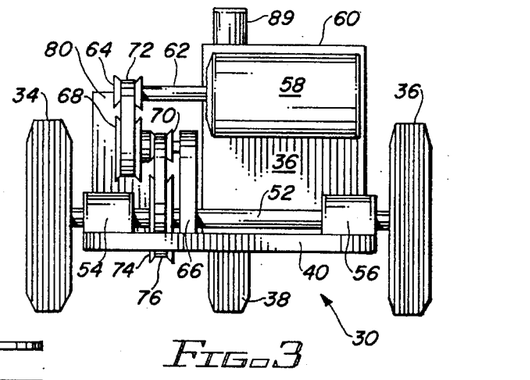
FIG. 3 is a rear view of the towing and guiding device as illustrated in FIGS. 1 and 2, showing the electric motor and the dual reduction pulley drive arrangement used to drive the live rear axle.

The preferred embodiment of the present invention presents a towing and guiding device 30 as illustrated in FIGS. 1 through 3 without its cover and its retaining mechanism installed, and showing only the lower portion of its control handle 32. The towing and guiding device 30 is self-powered to pull a line of shopping carts (not shown), and is compact in size, having two rear wheels 34 and 36 used for driving the device and one front wheel 38 used for steering the towing and guiding device 30.

The towing and guiding device 30 has a flat chassis 40 extending behind the front wheel 38, with a pair of support tubes 42 and 44 extending upwardly and centrally from positions near the sides of the chassis 40 at the front thereof. The support tubes 42 and 44 meet together to support a cylindrical fork support tube 46. A fork member 48 is rotatably supported by the fork support tube 46, with the front wheel 38 being rotatably mounted at the bottom of the fork member 48.

Fixedly mounted at the top of the fork member 48 is a steering block 50, which, when rotated, will rotate the fork member 48 and the front wheel 38. The control handle 32 is mounted onto the steering block 50, and, when moved about the axis defined by the fork support tube 46, will rotate the steering block 50, the fork member 48, and the front wheel 38. The control handle 32 is adjustable in height between the position illustrated in FIG. 1 (where it is supported by the steering block 50) and the axis defined by the fork support tube 46.

The rear wheels 34 and 36 are fixedly mounted on a live axle 52, which is supported by a pair of bearing members 54 and 56 (best illustrated in FIGS. 2 and 3), which are secured to the chassis 40. Drive power is provided by a DC electrical motor 58, which is mounted on a motor support member 60 extending upwardly from the chassis 40. Extending from the left side of the electrical motor 58 is a motor shaft 62.

Mounted on the end of the motor shaft 62 is a drive pulley 64. Extending upwardly from the chassis 40 below the motor shaft 62 at the point where the motor shaft 62 extends from the electrical motor 58 is a pulley support member 66, which is used to rotatably support a dual pulley member consisting of a larger driven pulley 68 and a smaller drive pulley 70. The larger driven pulley 68 is located below the drive pulley 64, and is driven by the drive pulley 64 via a belt 72.

A larger driven pulley 74 is located on the live axle the live axle 52 below the smaller drive pulley 70, and is driven by the smaller drive pulley 70 via a belt 76. The larger driven pulley 74 extends through a slot 78 (best shown in FIG. 2) located in the chassis 40. It will thus be appreciated by those skilled in the art that the electrical motor 58 is used to drive the live axle 52 and the rear wheels 34 and 36 via a dual reduction pulley drive arrangement.

When DC power is supplied to the electrical motor 58 in a first polarity, the electrical motor 58 will cause the rear wheels 34 to rotate in a first direction. Similarly, when DC power is supplied to the electrical motor 58 in a second polarity opposite to the first polarity, the electrical motor 58 will cause the rear wheels 34 to rotate in a second direction opposite to the first direction.

Located on the chassis 40 in front of the motor support member 60 are two 12 Volt automobile-type batteries 80 and 82. The batteries 80 and 82 are located in a side-by-side configuration, with a space located between them. Located in front of the battery 80 is a battery charger 84. Located in front of the battery 82 at the right front corner of the chassis 40 is a recharging cord retractor mechanism 86 having a plug 88 extending therefrom. Extending vertically from the chassis 40 between the batteries 80 and 82 is a cylindrical tow bar support post 89, which will be used to support the retaining mechanism from a position on the towing and guiding device 30 intermediate the rear wheels 34 and 36 and the front wheel 38.

Figure 4:
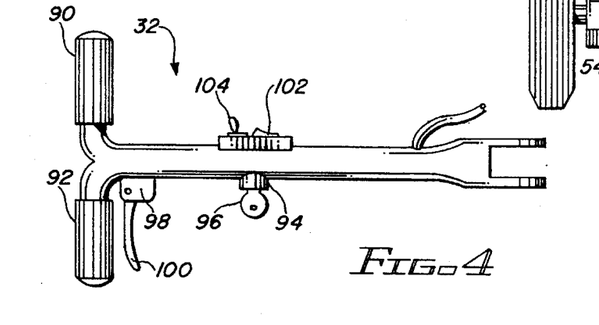
FIG. 4 is a top plan view of the T-shaped control handle of the preferred embodiment which is used to steer the front wheel (FIG. 1) of the towing and guiding device illustrated in FIGS. 1 through 3, showing the key switch, the on/off switch, the forward/reverse selecting switch, and the variable speed selecting switch.

Referring next to FIG. 4, the control handle 32 is illustrated. It may be seen that the control handle 32 has a T-shaped configuration, with two grips 90 and 92 located on the ends of the crossbar of the T. Located on the right side of the control handle 32 as illustrated in FIG. 4 is a key switch 94, which may be actuated with a key 96. Located on the control handle 32 near the grip 92 is an on/off switch 98, which is actuated by gripping a switch handle 100 and depressing it toward the grip 92.

Located on the left side of the control handle 32 as illustrated in FIG. 4 is a forward/reverse selecting switch 102. Also located on the left side of the control handle 32 is a variable speed selecting switch 104. Note that optionally the function of the variable speed selecting switch 104 may be combined with the on/off switch 98, such that the further the switch handle 100 is depressed toward the grip 92, the faster the speed of operation of the towing and guiding device 30 will become.

Figure 5:
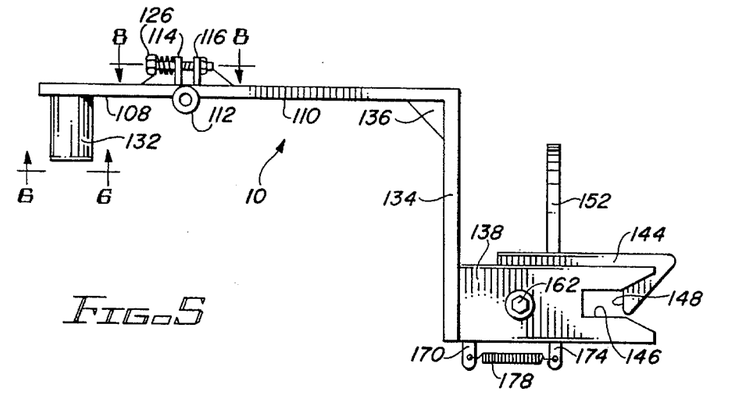
FIG. 5 is a side view of the tow bar used in the preferred embodiment of the present invention, which is supported by a cylindrical sleeve located at the left end (as illustrated in FIG. 5) of the horizontal member of the tow bar by the tow bar support post (FIGS. 1 and 2) upon the towing and guiding device of FIGS. 1 through 3, showing a height adjustment mechanism used in the horizontal member of the tow bar, and also showing a spring-loaded retaining mechanism supported at the lower end of the vertical member of the tow bar.

Referring next to FIGS. 5 through 8, the retaining mechanism of the preferred embodiment, which is a tow bar 106, is illustrated. The tow bar 106 includes a horizontal member made in two segments, namely a front horizontal member 108 and a rear horizontal member 110. The front horizontal member 108 and the rear horizontal member 110 are connected by a piano hinge mechanism 112 which allows the rear end of the rear horizontal member 110 (shown at the right in FIG. 5) to move up and down (as shown in FIG. 5).

Figures 7, 8, 12:
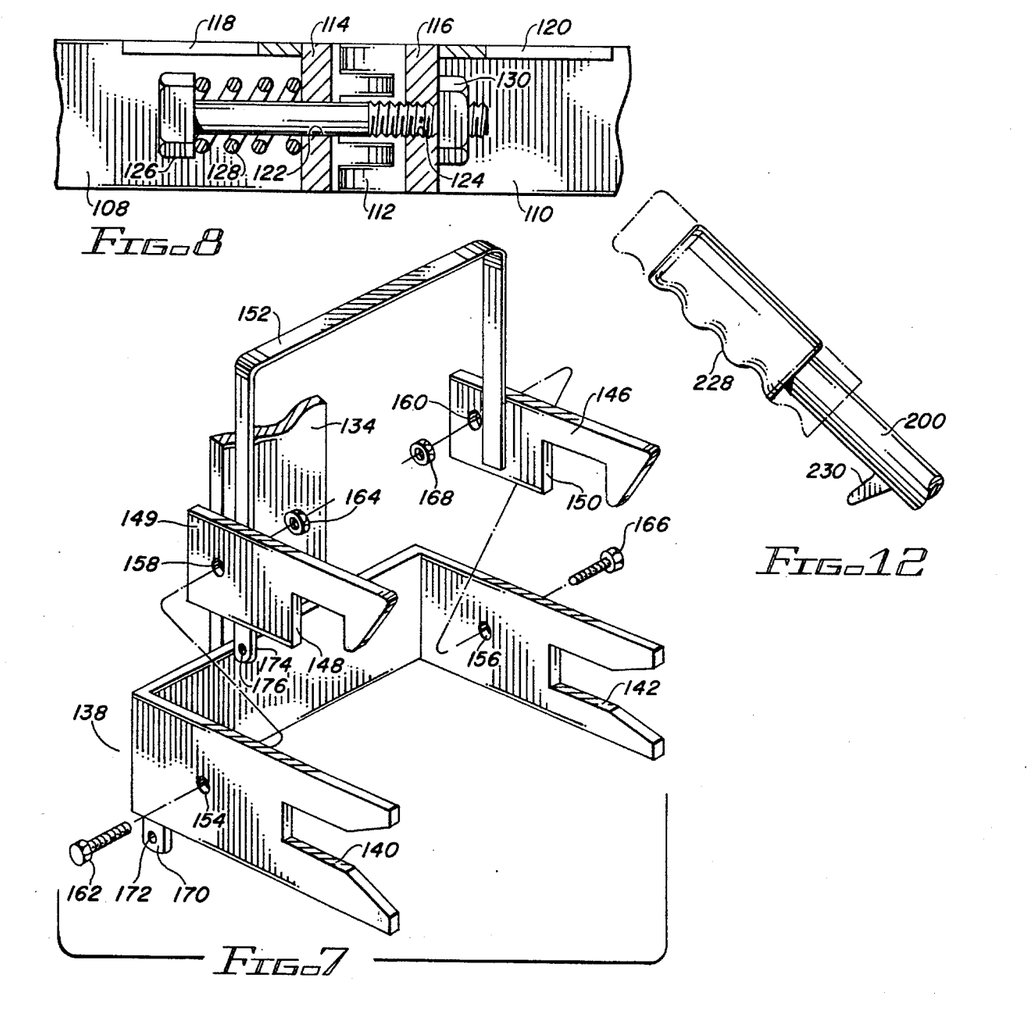
FIG. 7 is an exploded view of the retaining mechanism used in the tow bar illustrated in FIG. 5, showing a pair of spaced-apart open jaws mounted at the bottom of the vertical member of the tow bar, with a pivotably mounted pair of retaining jaws being supported by an inverted U-shaped handle and being mounted respectively adjacent the open jaws to releasably retain the bottom front cross-bar of the front-most shopping cart in the line of shopping carts (not shown)
FIG. 8 is a top plan view of the height adjusting mechanism located in the horizontal member of the tow bar illustrated in FIG. 5, showing a hinge assembly connecting the two halves of the horizontal member, and a spring-loaded adjustment mechanism which may be used to vary the height of the retaining mechanism illustrated in FIG. 5.
FIG. 12 is an alternate embodiment switch mechanism built into the grip of the stick-type handle which may be used with the towing and guiding device illustrated in FIG. 11.

Referring now to FIG. 8, the front horizontal member 108 has a flange plate 114 extending upwardly therefrom close to the location of the hinge mechanism 112. Similarly, the rear horizontal member 110 has a flange plate 116 extending upwardly therefrom close to the location of the hinge mechanism 112. The flange plates 114 and 116 are parallel to each other. A support plate 118 supports the flange plate 114 from the front horizontal member 108, and a support plate 120 supports the flange plate 116 from the rear horizontal member 110, as best shown in FIG. 8.

The flange plate 114 has an aperture 122 located therein, while the flange plate 116 has a threaded aperture 124 located therein. An adjustment bolt 126 has a spring 128 installed thereon, and is then first inserted through the aperture 122 in the flange plate 114, and then screwed into the threaded aperture 124 in the flange plate 116. A lock nut 130 is then threaded onto the end of the adjustment bolt 126. Referring again to FIG. 5, it will be appreciated by those skilled in the art that by rotating the adjustment bolt 126, the height of the right end of the rear horizontal member 110 may be adjusted.

Figure 6:
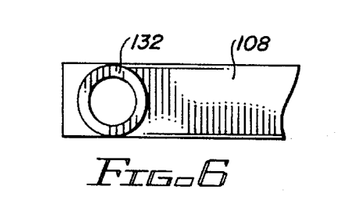
FIG. 6 is a bottom plan view of the cylindrical support sleeve located below the left end of the horizontal member of the tow bar (as illustrated in FIG. 5)

Located at the left end of the front horizontal member 108 on the bottom side thereof is a cylindrical support sleeve 132, which is best shown in FIG. 6. Referring once again to FIG. 5, located at the right end of the rear horizontal member 110 and extending downwardly therefrom is a vertical member 134. A brace member 136 is used to maintain the right angle between the rear horizontal member 110 and the vertical member 134.

Referring now to FIG. 7, a rectangular segment of flat material is bent into a U-shaped segment 138. The U-shaped segment 138 is mounted in a horizontal manner, with the center of the bottom of the U being attached to the bottom of the vertical member 134. Thus, the tops of the legs of the U extend to the right as illustrated in FIG. 7.

Located in the tops of the legs of the U-shaped segment 138 are notches 140 and 142. The notches 140 and 142 are tapered to be wider near the tops of the legs of the U, to thereby tend to catch a horizontal bar (not shown) therein. This horizontal bar is the bottom front cross-bar of the front-most shopping cart in the line of shopping carts (not shown).

Two retaining jaws 144 and 146 are made of flat segments. The retaining jaw 144 has a notch 148 located in the bottom side thereof nearer the right side than the left side thereof (as shown in FIG. 7). Similarly, the retaining jaw 146 has a notch 150 located in the bottom side thereof nearer the right side than the left side thereof (as shown in FIG. 7). The right sides of the retaining jaws 144 and 146 are each angled to extend further to the right at their respective top sides thereof than at their respective bottom sides thereof.

The retaining jaws 144 and 146 are respectively located inside the legs of the U-shaped segment 138. The retaining jaw 144 is located inside the leg of the U-shaped segment 138 having the notch 140 therein, while the retaining jaw 146 is located inside the leg of the U-shaped segment 138 having the notch 142 therein. The retaining jaws 144 and 146 are connected together by a U-shaped member 152 which maintains them in a parallel, spaced apart configuration.

The U-shaped segment 138 has an aperture 154 located in the leg of the U having the notch 140 therein, and an aperture 156 in the leg of the U having the notch 142 therein. The retaining jaw 144 has an aperture 158 located therein, while the retaining jaw 146 has an aperture 160 located therein. A bolt 162 extends through the aperture 154 in the U-shaped segment 138 and the aperture 158 in the retaining jaw 144, and is secured by a nut 164. A bolt 166 extends through the aperture 156 in the U-shaped segment 138 and the aperture 160 in the retaining jaw 146, and is secured by a nut 168.

A projection 170 extends downwardly from the U-shaped segment 138 at the base of the leg of the U having the notch 140 therein. The projection 170 has an aperture 172 located therein. A projection 174 extends from the bottom of the retaining jaw 144 midway between the left edge of the retaining jaw 144 and the notch 148 located in the retaining jaw 144. The projection 174 has an aperture 176 located therein.

Referring for the moment to FIG. 5 in addition to FIG. 7, a spring 178 has one end thereof located in the aperture 172 in the projection 170, and the other end thereof located in the aperture 176 in the projection 174. It will thus be appreciated by those skilled in the art that the spring 178 acts to urge the retaining jaws 144 and 146 into a position tending to retain a horizontal bar located in the notches 140 and 142 in the U-shaped segment 138 therein.

It will also be noted by those skilled in the art that the angled right sides of the retaining jaws 144 and 146 will urge the retaining jaws 144 and 146 to open when a horizontal bar contacts the angled right sides of the retaining jaws 144 and 146 and moves leftwardly. Finally, it will be noted that the U-shaped member 152 may be used to open the retaining jaws 144 and 146 manually, to release a horizontal bar retained within the notches 140 and 142 in the U-shaped segment 138.

Figure 9:
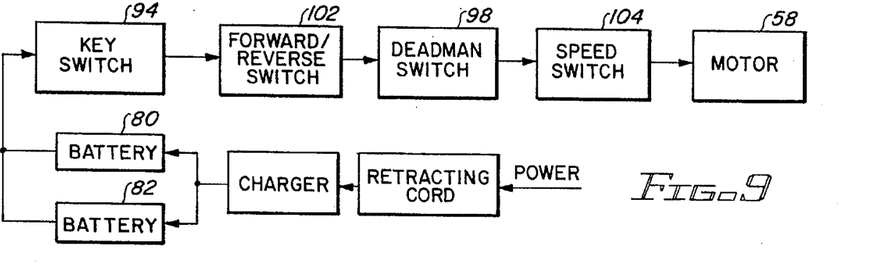
FIG. 9 is a functional schematic diagram of the electrical system of the towing and guiding device illustrated in FIGS. 1 through 3.

Referring now to FIG. 9, the interaction of the various electrical components illustrated in FIGS. 1 through 4 may now be discussed. To charge the batteries 80 and 82, power is supplied (via the plug 88 illustrated in FIGS. 1 through 3) to the recharging cord retractor mechanism 86 to the battery charger 84. The battery charger 84 will then charge the batteries 80 and 82.

To enable the operation of the towing and guiding device 30, the key switch 94 is turned on (with the key 96 illustrated in FIG. 4). The forward/reverse selecting switch 102 is set to choose the desired direction of operation. If the variable speed selecting switch 104 provided and if it is separate from the on/off switch 98, it is set to select the desired operating speed. Then the on/off switch 98 is depressed, which will supply electrical current to operate the electrical motor 58. If the variable speed selecting switch 104 is built into the same switch as the on/off switch 98, depressing it further will increase the speed of operation.

Figures 10, 13, 14, 18:
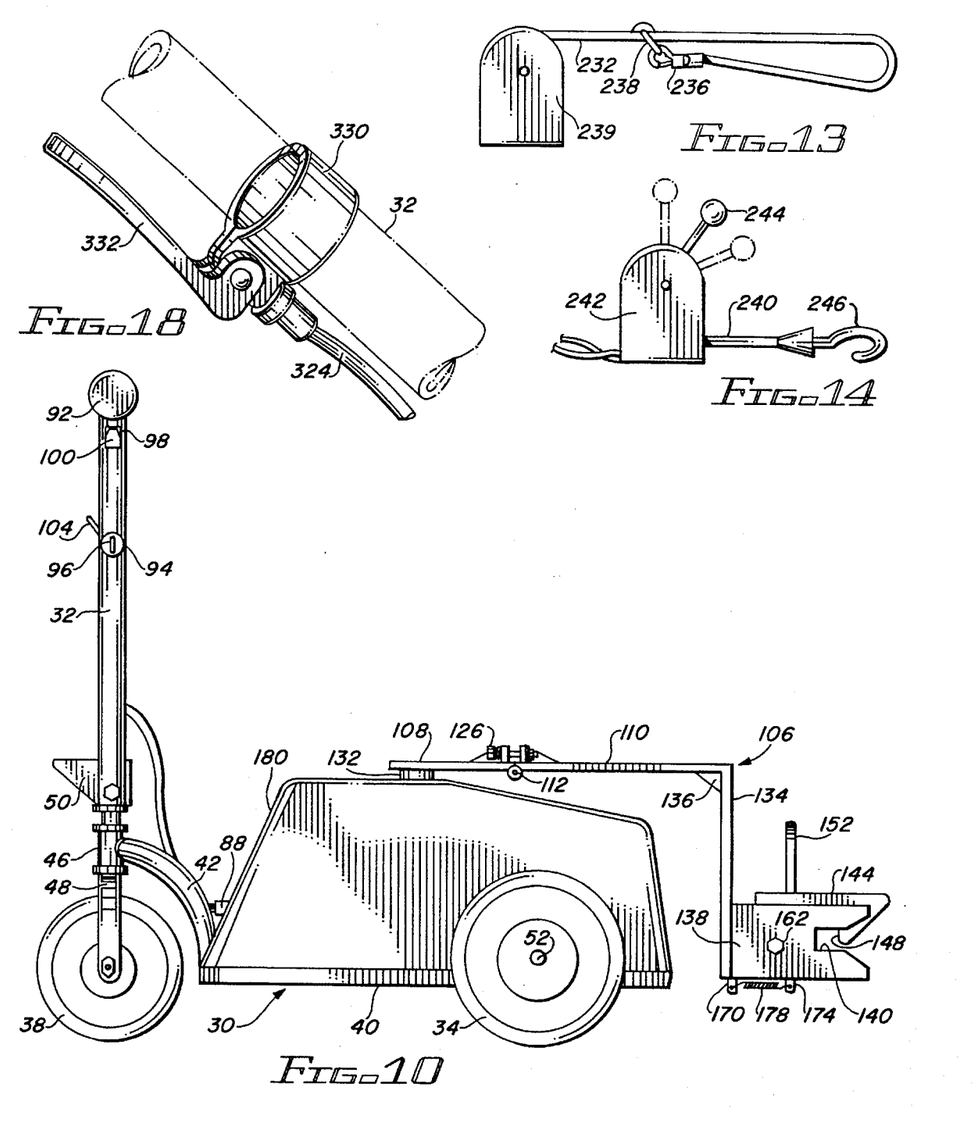
FIG. 10 is a fully assembled towing and guiding device, consisting of a cover located on the device illustrated in FIGS. 1 through 3, the handle illustrated in FIG. 4, and the tow bar illustrated in FIG. 5.
FIG. 13 is a side view of another alternate embodiment retaining mechanism for location at the rear of the towing and guiding device illustrated in FIG. 11, with the retaining mechanism consisting of a strap located on a strap reel having a motorized reel mechanism.
FIG. 14 is yet another alternate embodiment retaining mechanism for location at the rear of the towing and guiding device illustrated in FIG. 11, with the retaining mechanism consisting of a strap and ring mechanism located on a strap stored on a strap reel having a one-way reel mechanism.
FIG. 18 is a side view of a trigger mechanism for mounting on the control handle illustrated in FIG. 10.

Turning now to FIG. 10, the final assembly of the towing and guiding device 30 is illustrated. The control handle 32 is shown in its most upright position installed onto the steering block 50. A cover 180 is shown installed on the towing and guiding device 30. The tow bar 106 is installed onto the towing and guiding device 30 by placing the cylindrical support sleeve 132 (FIG. 6) over the tow bar support post 89 (FIGS. 1 through 3).

Figure 11:
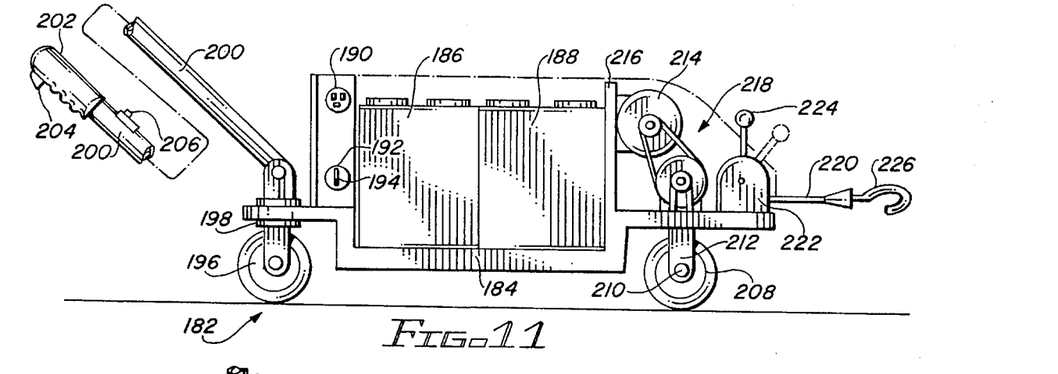
FIG. 11 is a side view of a smaller, alternate embodiment towing and guiding device having smaller wheels and a more compact configuration, showing a stick-type handle used to steer the device, and also showing an alternate embodiment retaining mechanism consisting of a strap located on a strap reel having a lock/unlock mechanism which is located at the rear of the device.

Referring next to FIG. 11, an alternate embodiment towing and guiding device 182 is illustrated which is even smaller in size than the towing and guiding device 30 illustrated in FIGS. 1 through 10. The towing and guiding device 182 has a chassis 184 which is lower in the middle than at the ends thereof. The chassis 184 holds two 12 Volt automotive type batteries 186 and 188 in its lowered central portion. The batteries 186 and 188 are oriented on the chassis 184 with their long sides adjacent each other, with the battery 186 being located nearer the front of the towing and guiding device 182, and the battery 188 being located nearer the back of the chassis 184.

A compartment located in front of the battery 186 on the chassis 184 contains a battery charger (not shown in FIG. 11) and a recharging cord retractor mechanism (also not shown in FIG. 11) having a plug 190 extending from the side of the compartment. Also mounted on the side of the compartment below the plug 190 is a key switch 192 having a key 194 located therein.

The towing and guiding device 182 has a single front wheel 196 which is rotatably mounted on a front wheel mounting mechanism 198, which is supported for rotation with respect to the chassis 184 about a vertical axis. A stick-type control handle 200 is mounted onto the front wheel mounting mechanism 198 at the top thereof. When the control handle 200 is moved about the vertical axis defined by the front wheel mounting mechanism 198, the control handle 200 will cause the front wheel mounting mechanism 198 and the front wheel 196 to rotate about the axis to steer the towing and guiding device 182.

The control handle 200 has a single grip 202 located at the end which is not connected to the front wheel mounting mechanism 198. Located on the control handle 200 and extending from the grip 202 is a switch 204 which functions both as an on/off switch and as a variable speed switch. When the switch 204 is initially depressed, the towing and guiding device 182 will be driven at a slow speed. As the switch 204 is further depressed, the speed of operation will be increased. Also located on the control handle 200 is a forward/reverse selecting switch 206.

The towing and guiding device 182 has two drive wheels (one of which is supplied with the reference numeral 208 and the other of which is not visible in the view of FIG. 11) mounted on a live rear axle 210 located at the rear thereof. The drive wheel 208 and the other drive wheel are supported for rotation beneath the chassis 184 by a support apparatus referred to generally with the reference numeral 212.

Drive power for the towing and guiding device 182 is supplied by a DC electrical motor 214, which is mounted on a motor support member 216 extending upwardly from the chassis 184 behind the battery 188. The electrical motor 214 drives the live axle 210 via a dual reduction pulley drive arrangement, which is generally referred to with the reference numeral 218. The dual reduction pulley drive arrangement 218 is similar in both construction and operation to the system described above with reference to the towing and guiding device 30, and thus will not be described in detail here.

The towing and guiding device 30 illustrated in FIG. 11 differs substantially from the towing and guiding device 30 illustrated in FIGS. 1 through 10 in the design of its retaining mechanism, which is located entirely at the rear of the towing and guiding device 182. The retaining mechanism of the towing and guiding device 182 consists of a strap 220 located on a strap reel 222 having a lock/unlock mechanism which is operated by a lock/unlock lever 224. A hook 226 is located at the free end of the strap 220.

The lock/unlock lever 224 is illustrated in FIG. 11 in its locked position. In this locked position, the strap 220 cannot be drawn out further from the strap reel 222. The lock/unlock lever 224 is shown in phantom lines in its unlocked position. In the unlocked position, the strap 220 may be retracted by spring action back into the strap reel 222, or drawn out further from the strap reel 222. Also shown in phantom lines in FIG. 11 is a cover which will extend over the batteries 186 and 188, the electrical motor 214, the dual reduction pulley drive arrangement 218, and the strap reel 222.

Referring next to FIG. 12, an alternate actuation mechanism is illustrated at the end of the control handle 200. A grip handle 228 is mounted at the end of the control handle 200, with the grip handle 228 being moveable in either direction with respect to the control handle 200, as illustrated by phantom lines. The grip handle 228 is spring biased into the central position, and functions both as an on/off switch and as a forward/reverse switch. By pulling the grip handle 228, forward will be selected, and by pushing the grip handle 228, reverse will be selected. Also mounted on the control handle 200 in FIG. 12 is a variable speed selecting switch 230.

Referring now to FIG. 13, another retaining mechanism is illustrated for use instead of the strap reel 222 illustrated in FIG. 11. This retaining mechanism consists of a strap 232 located on a strap reel 234 having a one-way reel mechanism which, once initially extended, will not allow the strap 232 to be again extended until it is substantially entirely retracted. The strap 232 has a hook 236 located at the end thereof, and a ring 238 mounted thereon at a location spaced away somewhat from the end of the strap 232.

Referring next to FIG. 14, yet another retaining mechanism is illustrated for use instead of the strap reel 222 illustrated in FIG. 11. This retaining mechanism consists of a strap 240 located on a strap reel 242 having an electrically powered motorized mechanism. The strap reel 242 is operated by a control lever 244, which is shown in its neutral position in FIG. 14. In this neutral position, the strap 240 may not be further pulled from the strap reel 242, and will not be retracted into the strap reel 242.

By pulling the control lever 244 to the right to a position shown in phantom lines in FIG. 14, the strap reel 242 will be operated to allow the strap 240 to be pulled from the strap reel 242. By pushing the control lever 244 to the left to a position also shown in phantom lines in FIG. 14, the strap reel 242 will be operated to retract the strap 240 into the strap reel 242. The strap 240 has a hook 246 located at the end thereof.

Figure 15:
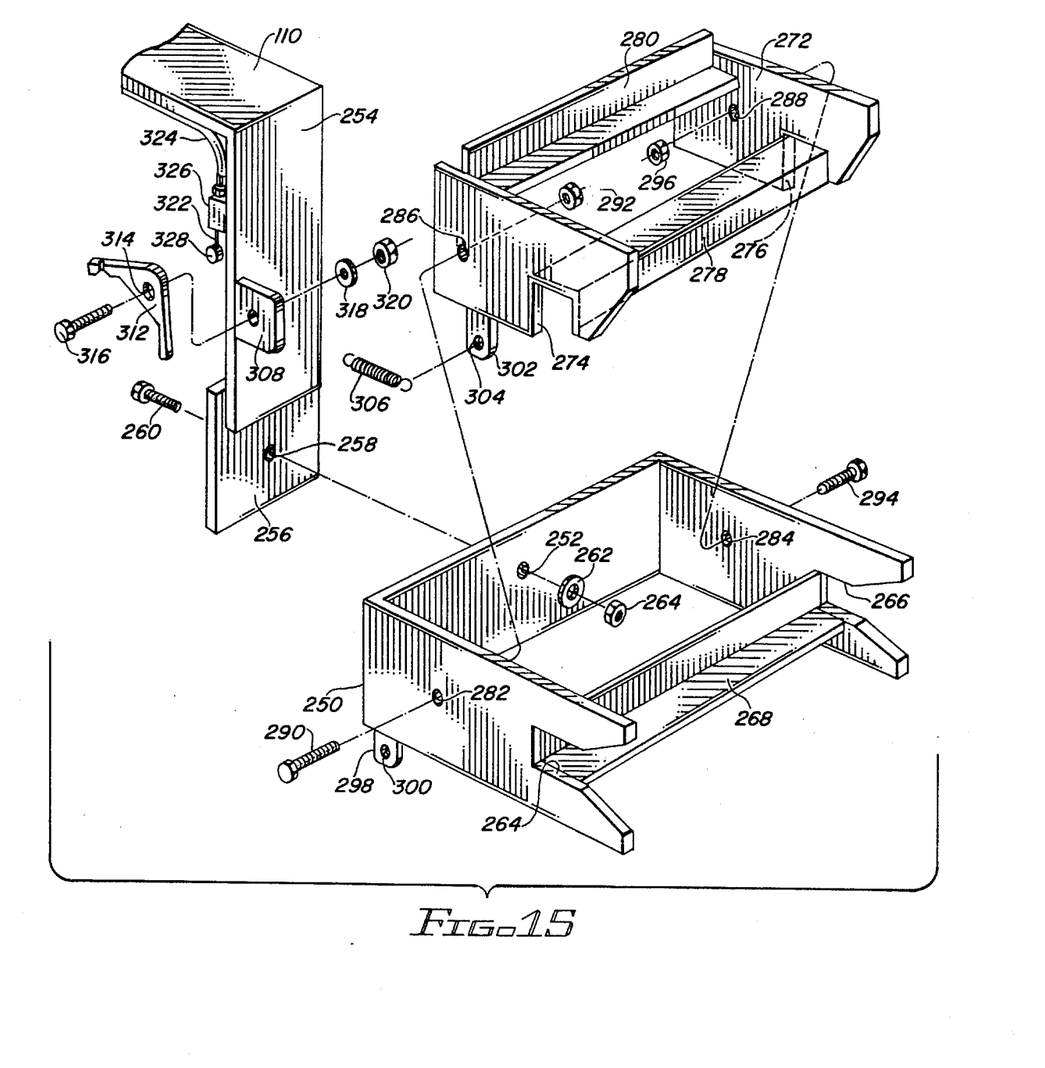
FIG. 15 is an exploded view of the preferred embodiment retaining mechanism which may be used instead of the retaining mechanism illustrated in FIG. 7, showing a first horizontal angle support mounted on the pair of spaced-apart open jaws mounted at the bottom of the vertical member of the tow bar, with a second horizontal angle support and an additional angle support member being mounted between a pivotably mounted pair of retaining jaws, which retaining jaws are mounted respectively adjacent the open jaws to releasably retain the bottom front cross-bar of the front-most shopping cart in the line of shopping carts (not shown)

Referring next to FIG. 15, a retaining mechanism is shown which may be used instead of the retaining mechanism illustrated in FIG. 7. A rectangular segment of flat material is bent into a U-shaped segment 250. The U-shaped segment 250 has an aperture 252 centrally located in the base of the U. A vertical member 254 extends downwardly from the rear horizontal member 110. Mounted on the side of the vertical member 254 under the rear horizontal member 110 is a mounting plate 256. The mounting plate 256 extends downwardly from the vertical member 254, and has an aperture 258 located centrally therein.

The U-shaped segment 250 is mounted onto the mounting plate 256 with a bolt 260 which extends through the aperture 258 in the mounting plate 256 and then through the aperture 252 in the U-shaped segment 250. A washer 262 and a nut 264 are then placed onto the bolt 260 to secure the U-shaped segment 250 to the mounting plate 256 such that the U-shaped segment 250 is located below and slightly away from the bottom of the vertical member 254, thereby allowing the U-shaped segment 250 to rotate about the bolt 260 through a small angle of rotation. Thus, the tops of the legs of the U of the U-shaped segment 250 extend to the right as illustrated in FIG. 15.

Located in the tops of the legs of the U-shaped segment 250 are notches 264 and 266. The notches 264 and 266 are tapered to be wider near the tops of the legs of the U, to thereby tend to catch the bottom front cross-bar carts (not shown) of the front-most shopping cart in a line of shopping carts (also not shown). Extending between the legs of the U-shaped segment 250 adjacent the two sides of the notches 264 and 266 shown at the left and at the bottom of the notches 264 and 266 in FIG. 15 is a first horizontal angle support 268. The first horizontal angle support 268 is made of angle iron.

Figure 17:
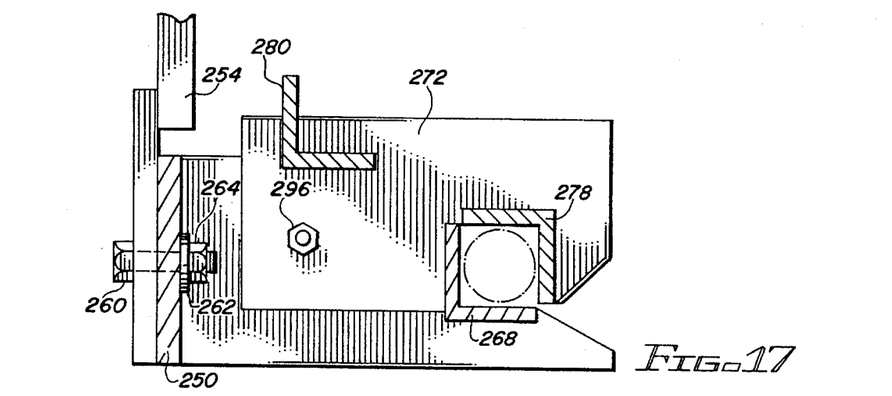
FIG. 17 is a cutaway side view of the retaining mechanism illustrated in FIGS. 15 and 16.

Two retaining jaws 270 and 272 are made of flat segments. The retaining jaw 270 has a notch 274 located in the bottom side thereof which is nearer the right side than the left side thereof (as shown in FIG. 15). Similarly, the retaining jaw 272 has a notch 276 located in the bottom side thereof which is nearer the right side than the left side thereof (as best shown in FIG. 17). The right sides of the retaining jaws 270 and 272 are each angled to extend further to the right at their respective top sides thereof than at their respective bottom sides thereof.

The retaining jaws 270 and 272 are respectively located inside the legs of the U-shaped segment 250. The retaining jaw 270 is located inside the leg of the U-shaped segment 250 having the notch 264 therein, while the retaining jaw 272 is located inside the leg of the U-shaped segment 250 having the notch 266 therein. The retaining jaws 270 and 272 are connected together by a second horizontal angle support 278 and an additional angle support member 280.

The second horizontal angle support extends between the retaining jaws 270 and 272 adjacent the two sides of the notches 274 and 276 shown at the right and at the top of the notches 274 and 276 in FIG. 15. The additional angle support member 280 extends between the retaining jaws 270 and 272 near the left sides of the retaining jaws 270 and 272, with a portion of the additional angle support member 280 extending above the top edges of the retaining jaws 270 and 272. The second horizontal angle support 278 and the additional angle support member 280 are both made of angle iron.

The U-shaped segment 250 has an aperture 282 located in the leg of the U having the notch 264 therein, and an aperture 284 in the leg of the U having the notch 266 therein. The retaining jaw 270 has an aperture 286 located therein, while the retaining jaw 272 has an aperture 288 located therein. A bolt 290 extends through the aperture 282 in the U-shaped segment 250 and the aperture 286 in the retaining jaw 270, and is secured by a nut 292. A bolt 294 extends through the aperture 284 in the U-shaped segment 250 and the aperture 288 in the retaining jaw 272, and is secured by a nut 296.

A projection 298 extends downwardly from the U-shaped segment 250 at the base of the leg of the U having the notch 264 therein. The projection 298 has an aperture 300 located therein. A projection 302 extends from the bottom of the retaining jaw 270 midway between the left edge of the retaining jaw 270 and the notch 274 located in the retaining jaw 270. The projection 302 has an aperture 304 located therein.

A spring 306 has one end thereof located in the aperture 300 in the projection 298, and the other end thereof located in the aperture 304 in the projection 302. It will thus be appreciated by those skilled in the art that the spring 306 acts to urge the retaining jaws 270 and 272 into a position tending to retain a horizontal bar located in the notches 264 and 266 in the U-shaped segment 250 therein. It will also be noted by those skilled in the art that the angled right sides of the retaining jaws 270 and 272 will urge the retaining jaws 270 and 272 to open when a horizontal bar contacts the angled right sides of the retaining jaws 270 and 272 and moves leftwardly.

The first horizontal angle support 268 and the second horizontal angle support 278 define a square space therebetween, which will act to retain the bottom front cross-bar (not shown) of the front-most shopping cart in the line of shopping carts (also not shown) between the first horizontal angle support 268 and the second horizontal angle support 278. Thus, the first horizontal angle support 268 and the second horizontal angle support 278 will prevent the retaining mechanism illustrated in FIG. 15 from slipping around the bends at the bottom front cross-bar (not shown).

A pivot support plate 308 is mounted at the side of vertical member 254 facing the retaining mechanism. The pivot support plate 308 has an aperture 310 located therein. An L-shaped pivot arm 312 has an aperture 314 located therein at the corner of the L. The L-shaped pivot arm 312 is rotatably mounted onto the pivot support plate 308 using a bolt 316 which extends through the aperture 314 in the L-shaped pivot arm 312 and through the aperture 310 in the pivot support plate 308. A washer 318 and a nut 320 are mounted onto the end of the bolt 316.

Figure 16:
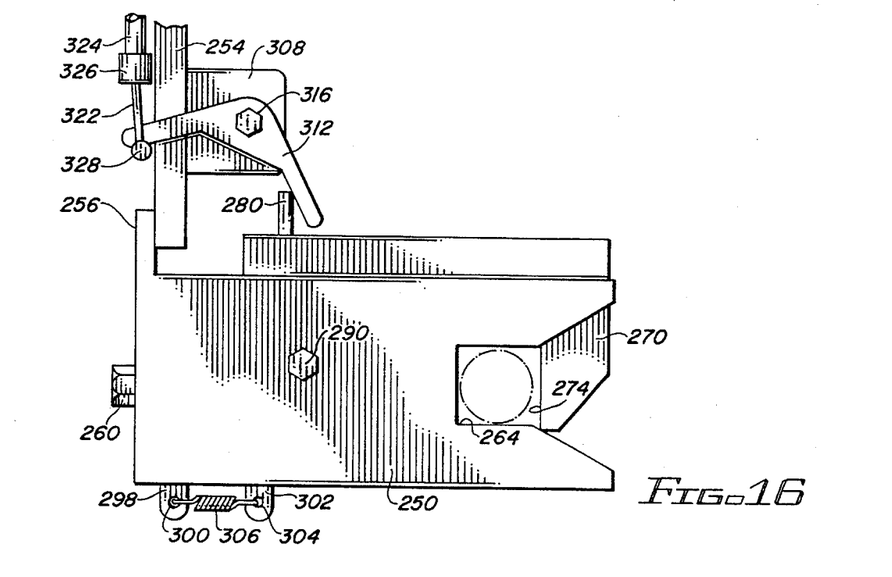
FIG. 16 is a side view of the retaining mechanism illustrated in FIG. 15.

A cable 322 is mounted in a tube 324 having one end secured to the vertical member 254 with a mounting member 326. The cable 322 has an end member 328 for attachment to one end of the L-shaped pivot arm 312. Referring briefly to FIGS. 16 and 17, it will at once be appreciated by those skilled in the art that when the cable 322 is pulled to actuate the one end of the L-shaped pivot arm 312, the other end of the L-shaped pivot arm 312 will engage a portion of the additional angle support member 280 which extends above the top edges of the retaining jaws 270 and 272, causing the retaining jaws 270 and 272 to open, releasing the bottom front cross-bar (shown in phantom lines) of the front-most shopping cart in the line of shopping carts (also not shown) from its engagement between the first horizontal angle support 268 and the second horizontal angle support 278.

Referring finally to FIG. 18 together with FIG. 16, a trigger mechanism for mounting on the control handle 32 (shown in phantom lines in FIG. 18 and illustrated in FIG. 10) is shown. A mounting band 330 may be used to mount the trigger mechanism onto the control handle 32. A spring-loaded trigger member 332 is pivotably mounted onto the mounting band. When the trigger member is operated, it will pull the end of the cable 322 not attached to the L-shaped pivot arm 312. The cable 322 is carried within the tube 324, which extends between the mounting member 326 and the trigger mechanism. Triggering mechanisms as illustrated in FIG. 18 are well-known in the art, and will not be further described herein.

It may therefore be appreciated from the above detailed description of the preferred embodiment of the present invention that it teaches a device which is capable of easily towing and guiding a line of tied-together shopping carts through a parking lot to a store, through the door of the store, and into their desired place in the store. As such, the towing and guiding device of the present invention is operable by one person, thereby reducing the labor required to gather the shopping carts, tow them through the parking lot, and take them into the store into their desired storage location. The towing and guiding device of the present invention is easy to operate, and it is also highly maneuverable to thereby allow the line of shopping carts to be easily maneuvered around obstacles in the parking lot and through the doors of the store.

The towing and guiding device of the present invention is also highly compact in size, thereby further facilitating its maneuverability and enhancing its ability to be stored in a relatively small amount of space. In addition, it is self-powered to facilitate moving the line of shopping carts easily, without requiring great strength to be exerted by the operator of the device. The towing and guiding device of the present invention is also electric powered to eliminate the emission of air pollution in the parking lot and in the store, and also to make the operation of the towing and guiding device virtually completely quiet.

The towing and guiding device of the present invention is of construction which is both durable and long lasting, and will require little or no maintenance to be provided by the user throughout its operating lifetime. It is also of economical construction to thereby enhance its market appeal, and to afford it the broadest possible market. Finally, all of the aforesaid advantages and objectives of the towing and guiding device of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A towing and guiding device for pulling a plurality of shopping carts connected in a line or other like load, said towing and guiding service comprising:

a chassis member having a front end thereof and a rear end thereof;

a pair of drive wheels rotatably mounted on opposite sides of said chassis member relatively nearer to the rear of said chassis than to the front of said chassis;

means for driving said drive wheels to propel said towing and guiding device;

a single front wheel rotatably mounted by support apparatus at the front of said chassis, said support apparatus being moveable to turn said front wheel to steer said towing and guiding device;

a control handle having a first end and a second end, said control handle being operatively connected at said first end thereof to said support apparatus to control the steering of said towing and guiding device by turning said front wheel in a desired direction;

control means for operating said driving means to selectively cause said driving means to propel said towing and guiding device;

retaining means mounted on said chassis member for removably engaging the plurality of shopping carts connected in a line or other like load behind said towing and guiding device;

battery means for supplying electrical power stored in said battery means;

an electric motor for operation by electrical power derived from said battery means;

power transmitting means connected between said electric motor and said drive wheels for driving said drive wheels when said electric motor is operated;

a battery charger for charging said battery means, said battery charger being mounted on said chassis member; and a recharging cord retractor mechanism mounted on said chassis member, said recharging cord retractor mechanism containing a cord connected at one end to said battery charger and having a plug located at the other end for connected to a source of electrical power for recharging said battery means.

2. A towing and guiding device as defined in claim 1, wherein said retaining means comprises:

a strap being selectively extendible and retractable from a strap reel mounted at said rear end of said chassis; and hook means located at an end of said strap for securing said plurality of shopping carts connected in a line or the like.

3. A towing and guiding device as defined in claim 2, wherein said strap reel comprises:

a lock/unlock mechanism which is operated by a lock/unlock lever, said lock/unlock mechanism allowing said strap to be retracted into said strap reel or extended further from said strap reel when said lock/unlock lever is in a first unlocked position, said lock/unlock mechanism preventing said strap from being retracted into said strap reel or extended further from said strap reel when said lock/unlock lever is in a second locked position.

4. A towing and guiding device as defined in claim 2, wherein said strap reel comprises:

a one-way reel mechanism which, when said strap is initially extended, will not allow said strap to be further extended until it is substantially entirely retracted into the strap reel.

5. A towing and guiding device as defined in claim 2, wherein said strap reel comprises:

an electrically powered motorized mechanism for selectively retracting said strap into said strap reel or allowing said strap to be further extended from said strap reel.

6. A towing and guiding device for pulling a plurality of shopping carts connected in a line or other like load, said towing and guiding service comprising:

a chassis member having a front end thereof and a rear end thereof;

a pair of drive wheels rotatably mounted on opposite sides of said chassis member relatively nearer to the rear of said chassis than to the front of said chassis;

means for driving said drive wheels to propel said towing and guiding device;

a single front wheel rotatably mounted by support apparatus at the front of said chassis, said support apparatus being moveable to turn said front wheel to steer said towing and guiding device;

a control handle having a first end and a second end, said control handle being operatively connected at said first end thereof to said support apparatus to control the steering of said towing and guiding device by turning said front wheel in a desired direction;

control means for operating said driving means to selectively cause said driving means to propel said towing and guiding device;

retaining means mounted on said chassis member for removably engaging the plurality of shopping carts connected in a line or other like load behind said towing and guiding device; and a T-shaped control handle, wherein the bottom of the leg of the T comprises said first end of said control handle, said T-shaped handle having grips located at the ends of the crossbar of the T.

7. A towing and guiding device as defined in claim 6, wherein said control means comprises:

an on/off switch mounted on said control handle, said on/off switch having a switch handle located adjacent to and spaced away from the crossbar of the T at one side thereof, said on/off switch being actuated by depressing said switch handle toward the crossbar of the T at said one side thereof, said on/off switch when so actuated causing said driving means to propel said towing and guiding device.

8. A towing and guiding device for pulling a plurality of shopping carts connected in a line or other like load, said towing and guiding service comprising:

a chassis member having a front end thereof and a rear end thereof;

a pair of drive wheels rotatably mounted on opposite sides of said chassis member relatively nearer to the rear of said chassis than to the front of said chassis;

means for driving said drive wheels to propel said towing and guiding device;

a single front wheel rotatably mounted by support apparatus at the front of said chassis, said support apparatus being moveable to turn said front wheel to steer said towing and guiding device;

a control handle having a first end and a second end, said control handle being operatively connected at said first end thereof to said support apparatus to control the steering of said towing and guiding device by turning said front wheel in a desired direction;

control means for operating said driving means to selectively cause said driving means to propel said towing and guiding device;

retaining means mounted on said chassis member for removably engaging the plurality of shopping carts connected in a line or other like load behind said towing and guiding device;

a tow bar support post extending vertically from a centrally located position on said chassis member;

a horizontal member having a first end and a second end, said first end of said horizontal member being suspended from said tow bar support post;

a vertical member having a first end and a second end, said first end of said vertical member being attached to said second end of said horizontal member, said vertical member extending downwardly from said horizontal member; and means for releasably engaging in a horizontal bar or the like, said engaging means being mounted on said second end of said vertical member.

9. A towing and guiding device as defined in claim 8, wherein said engaging means is mounted on said second end of said vertical member in a manner allowing limited rotation of said engaging means with respect to said vertical member in an axis perpendicular to said vertical member, whereby said engaging means is free to rotate to engage a bar which is angled somewhat away from a horizontal position.

10. A towing and guiding device as defined in claim 8, wherein said retaining means additionally comprises:

means for adjusting the height of said engaging means.

11. A towing and guiding device as defined in claim 8, wherein said releasing means comprises:

a first retaining member having a pair of spaced-apart jaws opening on a side of said first retaining member; and a second retaining member having a pair of spaced-apart jaws opening on a bottom side of said second retaining member, said second retaining member being pivotably mounted with respect to said first retaining member to move between a first position in which said spaced-apart jaws of said second retaining member are axially aligned with said spaced-apart jaws of said first retaining member and a second position in which said spaced-apart jaws of said second retaining member are lifted out of axial alignment with said spaced-apart jaws of said first retaining member.

12. A towing and guiding device as defined in claim 11, wherein said spaced-apart jaws of said second retaining member are located between said spaced-apart jaws of said first retaining member.

13. A towing and guiding device as defined in claim 11, additionally comprising:

means for biasing said second retaining member into said first position.

14. A towing and guiding device as defined in claim 11 additionally comprising:

means for selective actuation by a user of said towing and guiding device to move said second retaining member from said first position to said second position.

15. A towing and guiding device as defined in claim 14, wherein said means for selective actuation is located remotely from said releasing means.

16. A towing and guiding device as defined in claim 11, additionally comprising:

a first horizontal angle support member extending between said spaced-apart jaws of said first retaining member, said first horizontal angle support member having two orthogonal sides respectively located at the bottom and the innermost side of said spaced-apart jaws of said first retaining member; and a second horizontal angle support member extending between said spaced-apart jaws of said second retaining member, said second horizontal angle support member having two orthogonal sides respectively located at sides of said spaced-apart jaws of said first retaining member such that said first and second horizontal angle support members together define a square space therebetween when said second retaining member is located in said first position.

\* \* \* \* \*